United States Patent Office 3,449,249
Patented June 10, 1969

3,449,249
LUBRICANT COMPOSITIONS
William S. Anderson, Oakland, Calif., assignor to Shell Oil Company, New York, N.Y., a corporation of Delaware
No Drawing. Filed May 8, 1964, Ser. No. 366,189
Int. Cl. C10m *1/18, 1/32*
U.S. Cl. 252—51.5
6 Claims This invention relates to lubricants containing the 1,3-polymer of 3-methylbutene-1.

For many years, lubricating oils have been prepared from petroleum distillate fractions by various refining techniques. To meet qualifications required by certain applications, additives have been incorporated to improve oxidation stability, viscosity index, pour point, and many other properties.

In recent years, the more stringent requirements imposed on lubricating oils have prompted research related to entirely new kinds of oils. New, more stable molecules which can provide satisfactory lubrication over wide temperature ranges, for example —65° F. to as high as 500° F., are required. Automobile manufacturers are consistently recommending longer intervals between services for new cars. Since conventional mineral oils are not always satisfactory for these applications, various synthetic oils have been investigated.

Possibly one of the earliest areas of investigation of synthetic lubricants or synthesized hydrocarbon additives is that of polyolefins. Polyisobutylene, for example, has been used as a synthetic oil for over 30 years. Even after hydrogenation, polyolefins generally were unsatisfactory lubricants because of one or more limiting deficiencies, often attributable to the structure of the polymer itself. For example, polyisobutylene, before or after hydrogenation, has relatively poor viscosity-temperature characteristics and is susceptible to degradation by heat. These undesirable characteristics are believed to be caused, at least in part, by the rigid, strained nature of the polyisobutylene molecule, a result of the "repulsion" or "crowding" of the gem-dimethyl groups on alternate carbon atoms in the main chain.

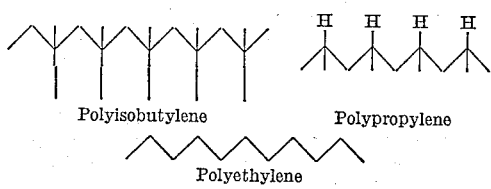

Polyisobutylene    Polypropylene

Polyethylene

Polypropylene, while not having the rigid nature of the polyisobutylene molecule, has tertiary hydrogen atoms at each second carbon of the main chain (see skeletal diagram). These tertiary hydrogens are potential sites for severe oxidative attack. Ethylene polymers have very high pour points attributable to the lack of side chains. Polymers of higher alpha-olefins are deficient for various reasons; in general, they have quite low viscosities or break down very rapidly in shear gradients.

It has now been discovered that the 1,3 polymer of 3-methylbutene-1 is an excellent lubricating oil constituent. This polymer, which can be realized only under certain special conditions of polymerization, provides lubricating oil constituents which possess excellent thermal, shear, and oxidation stability. The polymer may be used as a base stock, a viscosity index improver, or a building block for a larger molecule, such as a detergent.

The 1,3 polymer of 3-methylbutene-1 is obtained by polymerizing in such a manner that the 1, 2 and 3 carbon atoms all become part of the chain, rather than only the 1 and 2 carbon atoms as is the case in the 1,2 polymer.

In order to obtain this 1,3 polymer, a hydride shift must occur from carbon atom 3 to carbon atom 2 for each monomer adding to the main chain. A hydride ion is a hydrogen atom with two electrons. The hydride shift mechanism is as follows:

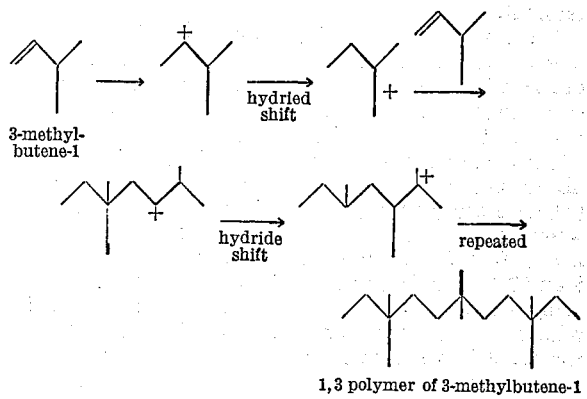

1,3 polymer of 3-methylbutene-1

Hydride shift polymers of 3-methylbutene-1 have been reported by Kennedy and Thomas, Makromolekulare Chemie, vol. 53, p. 28 (1962) and vol. 64, p. 1 (1963). These polymers were crystalline materials of high molecular weights (about 50,000) obtained over very active Friedel-Crafts catalysts (e.g., $AlCl_3$) at temperatures of —130° C. and below. The crystallinity and high molecular weights of these polymers, of course, preclude their use as lubricants and limit their use in oil additives. Although in theory polymers of lower molecular weight could be made by operating at higher temperatures, strongly acidic catalysts such as $AlCl_3$ become isomerization catalysts at temperatures of 0° C. and above; furthermore, it is indicated in the articles by Kennedy and Thomas that 1,2 polymerization rather than 1,3 polymerization was obtained at higher temperatures.

The superior properties of the 1,3 or "hydride-shift" polymer of 3-methylbutene-1 as compared with polyisobutylene probably derive from the insertion of another methylene group between the quaternary carbon atoms. This extra methylene group provides further separation of the gem-dimethyl groups, thus relieving molecular crowding or strain and providing a more "flexible" molecule. Therefore, the instant polymer has excellent shear resistance as well as a low pour point, good oxidation stability, etc. Accordingly, it is essential that a high proportion but not all of the polymer have a 1,3 structure rather than the 1,2 structure obtained in conventional polymerizations. The 1,2 polymer can be described as an ethylene chain with isopropyl groups attached to every other carbon atom in the chain. The skeletal diagram of the 1,2 polymer of 3-methylbutene-1 is compared with that of the 1,3 polymer below

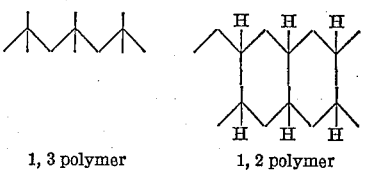

1, 3 polymer    1, 2 polymer

It is apparent that the 1,2 polymer is very oxidation-unstable because of the presence of tertiary hydrogens on both the main chain and the side group. Therefore, a preponderance (i.e., at least 50%) of 1,3 linkages is essential to the polymers of the invention. The repeating unit of the 1,3 polymer is

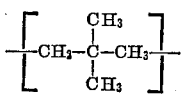

It is preferred that from about 60 to 98%, and more desirably 80 to 95% of the polymerizing molecules of 3-methylbutene-1 have their 1, 2, and 3 carbon atoms become part of the chain; i.e., from 60 to 98% and preferably 80 to 95% of the polymerization is hydride-shift polymerization. The remainder is made up of 1,2 linkages, and groups derived from the catalyst or solvent, cyclized units, and unsaturated end groups formed by hydride removal.

There are three general areas of applicability of the present polymers in lubricating oils. They may be used (1) as oil base stocks (after hydrogenation), (2) as viscosity-index improvers (generally also after hydrogenation), and (3) as building blocks for larger molecules which require a stable, long hydrocarbon chain, such as dispersants. When used as base stocks, the hydride-shift polymers are generally preferred to be in the molecular weight range of from about 200 to about 4000, preferably 300 to 2000. These base oils generally comprise at least 50% by weight and usually 80% or more of the oil composition; however, these polymers are soluble in mineral oils and can be mixed therewith in any concentration. It is preferred to use at least 30% by weight of the 1,3 polymer of 3-methylbutene-1, more preferably at least 60%. When used as a base stock, any of the well known additives may be added to provide improved viscosity index, pour point, oxidation stability, etc.

When used as viscosity-index improvers in mineral oils, hydride-shift polymers of 3-methylbutene-1 are generally preferred to be in the molecular weight range of from about 10,000 to 500,000, preferably 10,000 to 200,000. These long-chain polymers can be used to increase the VI of any mineral oil or other polymer-based oil. Although the theory of VI improvement is not completely understood, it is believed to relate to a change in the physical state of solution or dispersion of the polymer molecules with a change in temperature. Desirable concentrations of the instant polymer when used as a VI improver are from about 1 to about 10%, preferably 2 to 8% by weight of the lubricating oil.

As an example of the use of the instant polymer as a VI improver, a solution of 1.5% wt. of poly-3-methylbutene-1, 10,000 molecular weight, and about 80% 1,3 linkage in a mixture of neutral mineral oils had the following viscosities:

| Temperature, °F. | Viscosity of base oil, cs. | Viscosity of base oil, polymer blend, cs. |
|---|---|---|
| 100 | 34.70 | 45.33 |
| 210 | 5.40 | 6.82 |

Dispersant additives, commonly known as "detergents," are widely used in concentrations of from about 0.2 to 10% by weight to impart properties to oils which enable oxidation products, soots, resins, and other insoluble matter to remain in suspension or dispersion so that they will not alhere to metal surfaces to build up as sludge or varnish deposits. Dispersants may be made from the instant polymer by attaching polar groups, preferably nitrogen-containing polar groups, at the unsaturated end. Preferred polar groups contain only carbon, hydrogen, nitrogen, and a chalcogen, preferably oxygen. Molecular weights of the polar group are from about 100 to about 3000. Although it is preferred to have only one polymer chain attached to each polar group, it is also possible to have two or more chains attached to the group. Preferred polar groups contain at least 1, preferably 1 to 3 heterocyclic groups having from 5 to 15 members in each heterocyclic group; for example derivatives of pyridine, pyrazine, pyrrolidone, pyrrolidine, succinimide, oxazine, quinoline, morpholine, thiophene, etc. Members of the heterocyclic group are preferably selected from the group consisting of carbon, nitrogen, oxygen, and sulfur. Examples of suitable polar groups are the maleic anhydride—polyethylene imine adducts

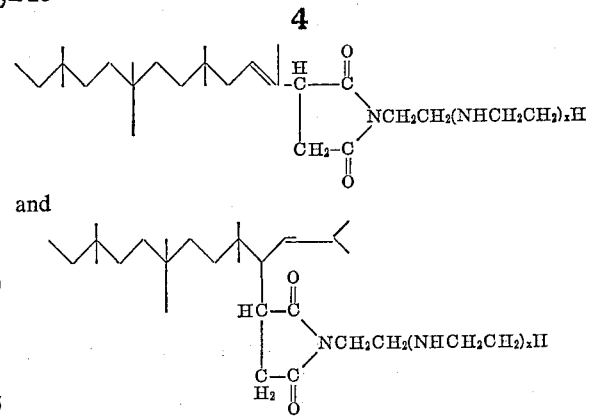

where $x=1$ to 10. Molecular weights of the poly(3-methylbutene-1) suitable for this purpose are generally preferred to be in the range 200 to 10,000, preferably 500 to 3000. The adduct is formed by first reacting the poly-3-methylbutene-1 with maleic anhydride, then with a polyethylene imine of the desired molecular weight, preferably tetraethylene pentamine. Molecular weights of the dispersant generally range from about 200 to about 12,000, preferably 400 to 8000. Variants on the structure above include (1) adduct in which the C=C double bond is hydrogenated, (2) adduct in which an alkenyl succinimide unit occurs at both ends of the polyimine chain, (3) adduct in which the imide structure is cyclized to imidazoline, (4) adduct in which the carbonyl groups are reduced to $CH_2$, (5) adduct which is formed by reacting poly-3-methylbutene-1 with HCl or HBr to obtain a long-chain alkyl halide, then using that alkyl halide to alkylate polyethylene imine, (6) adduct formed by reacting the formamide

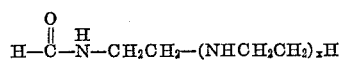

with the terminally unsaturated poly-3-methylbutene-1 in the presence of ultraviolet light.

To illustrate the superior properties of the polymer of the invention, oxidation and thermal stability comparisons were made with polyisobutylene.

Example I

Thermal stability of a polymer of 3-methylbutene-1 having about 80% 1,3 structure and having a molecular weight of about 10,000 and a polyisobutylene having a molecular weight of about 100,000 were determined thermogravimetrically. The polymers were heated under 50 ml./minute of nitrogen at temperatures increasing at the rate of 2.5° C. per minute. The temperatures required for each sample to lose a certain percent of its original weight are tabulated below.

| Weight loss | 2.5% | 5.0% | 10% | 15% | 20% |
|---|---|---|---|---|---|
| Polyisobutylene (° C.) | 280 | 292 | 308 | 319 | 326 |
| 3-methylbutene-1 (° C.) | 315 | 345 | 401 | 407 | 415 |

The data indicate that higher temperatures are necessary to decompose given amounts of poly(3-methylbutene-1) than polyisobutylene; thus, the 1,3 polymer of 3-methylbutene-1 is a more thermally stable material. Indeed, these results are conservative in that the lower mole weight polymer would be expected to show somewhat higher weight losses than the higher mole weight material.

Example II

Oxidation stabilities of a linear polyethylene, a polyisobutylene and poly(3-methylbutene-1) were determined by oxygen absorption tests conducted at 165° C. on 10% w. solutions of polymer in a solvent of bis(p-phenoxyphenyl) ether having about two tert-butyl substituents per molecule containing 0.20% w. copper naphthenate catalyst. The 3-methylbutene-1 polymer was approximately 80% 1,3 polymer, and had a molecular weight of about 10,000. The molecular weights of the polyethylene and polyisobutylene were about 20,000 and 100,000, respectively.

Polymer oxidation was measured by the liters of oxygen uptake per 500 grams of solution after 100 hours of bubbling oxygen through the samples.

Polymer:  Liters $O_2$(NTP)/500 grams solution absorbed in 100 hours
- Poly(3-methylbutene-1) _____ 2.5
- Polyethylene _____ 9
- Polyisobutylene _____ 3.5

The lower oxygen uptake by the poly(3-methylbutene-1) indicates the superior oxidation resistance of this polymer.

The 3-methylbutene-1 polymer of the invention can be prepared in several ways; however, it is essential that polymerization takes place in such a manner that the product predominates in 1,3 polymer. Very high-molecular-weight (e.g., solid and semi-solid) 1,3-polymers can be produced at low temperatures with Friedel-Crafts catalysts. These high-molecular-weight materials can then be cracked by well known methods to yield polymers suitable for use in lubricating oils. For example, the polymer of molecular weight 50,000 may be heated under high vacuum at 425° C. for fifteen minutes to give polymer of about 100 molecular weight. Preparation of the high-molecular-weight materials is described in detail in the Kennedy and Thomas articles noted above.

Predominantly hydride-shift polymers of 3-methylbutene-1 can also be prepared by polymerization over tetrahaloaluminate catalysts having the formula $$M(AlX_4)_n$$

wherein M is a metal or a mixture of metals, especially a metal from Group I, II, or VIII of the Periodic Table, especially Li, Na, and Co; $n$ is a whole number equal to the valence of M (i.e., $n$ is one if M is monovalent, two if M is divalent, etc.) and X is a halogen, preferably chlorine, bromine or iodine. Tetrahaloaluminates are white to greyish, brittle, low-melting crystalline solids. Some examples of these compounds are $NaAlCl_4$, $LiAlCl_4$, $Co(AlCl_4)_2$, $AgAlCl_4$, $NaAlBr_4$, $Be(AlBr_4)_2$, $Mg(AlCl_4)_2$, $Fe(AlCl_4)_2$, $NiAlBr_4)_2$, $LiAlI_4$, etc. Hydride-shift polymerization of 3-methylbutene-1 with these catalysts is described in copending application Ser. No. 314,910, filed Oct. 9, 1963, now abandoned.

Tetrahaloaluminate catalysts can be employed in any fashion known to those skilled in the art; for example, the catalyst can be powdered and used as a solid (at temperatures below the melting point of the salt), or can be used as a molten salt catalyst or supported on an inert carrier, such as porcelain, alumina, or charcoal. Monomer can be fed with or without a solvent to a reactor which contains the catalyst. If the catalyst is in the solid form, the catalyst may be retained in the reactor or part may be allowed to pass out with the reactor effluent. If some of the catalyst leaves the reactor, it may be separated and recycled or discarded, or may be allowed to pass out with the product. If the catalyst is used in the molten form, it may be separated from the reactor effluent (in which it is substantially insoluble) and recycled or discarded. Generally, any substance in which the reactants are soluble and which does not take part in the reaction is a suitable solvent; as examples, mention may be made of paraffins, such as isooctane; halogenated alkanes, such as methyl and ethyl chlorides, and methyl and ethyl bromides; 1,2-dichloroethane, carbon disulfide, nitrobenzene, nitromethane, vinyl chloride, etc. It is preferred to carry out the reaction in the presence of a solvent, because dilution of the monomer shows the addition rate of the monomer relative to the hydride shift reaction, insuring a high percentage of hydride-shift polymer. Furthermore, it is generally easier to handle the polymer in solution. When a solvent is used, volumetric solvent/monomer ratios are from about 0.5 to about 20, preferably from about 1 to about 10.

Polymerization temperatures with $M(AlX_4)_n$ catalysts are usually in the range of from about −50° C. to about 120° C., preferably from about 0 to about 100° C., depending on the concentration of the monomer and the desired molecular weight of the polymer. The polymerization is carried out in the liquid phase. Process pressures are not critical, except to keep the system substantially in the liquid phase; autogenous pressures are generally satisfactory.

Polymers prepared with $M(AlX_4)_n$ catalysts are preferred for use in lubricating oils because these catalysts produce the desired polymer directly; cracking of high-molecular-weight polymers is sometimes accompanied by other side reactions, such as rearrangement, which produce undesired properties in the product.

The following table illustrates the results of 3-methylbutene-1 polymerization over various tetrahaloaluminate catalysts. Product structure was determined by nuclear magnetic resonance and confirmed by infrared analyses to be at least about 80% 1,3 polymer in each case.

POLYMERIZATION OF 3-METHYLBUTENE-1 WITH HYDRIDE SHIFT OVER TETRAHALOALUMINATE SALTS

| Experiment number [1] | 1 | 2 | 3 | 4 | 5 | 6 | 7 |
|---|---|---|---|---|---|---|---|
| 3-methylbutene-1 (I), mmoles | 713 | 799 | 442 | 539 | 372 | 538 | 538. |
| Solvent (II) | None | n-$C_6H_{14}$ | n-$C_6H_{14}$ | "Isooctane" | 1,2-$C_2H_4Cl_2$ | 1,2-$C_2H_4Cl_2$ | "Isooctane." |
| Solvent, mmoles | | 230 | 230 | 113 | 247 | 252 | 115. |
| Catalyst (III) | $LiAlCl_4$ | $LiAlCl_4$ | $LiAlCl_4$ | $NaAlCl_4$ | $NaAlCl_4$ | $Co(AlCl_4)_2$ | $Co(AlCl_4)_2$. |
| Catalyst, mmoles | 28.1 | 4.2 | 4.2 | 4.7 | 5.6 | 3.5 | 3.5. |
| Order of addition | III, I | I, III [3] | I, III [3] | III, II, I [4] | III, II, I [4] | III, II, I [4] | III, II, I.[4] |
| Temperature, ° C. ±5 | 20–40 max | 30 | 65 | 105 | 100 | 104 | 105. |
| Pressure, p.s.i.g. ±5 | 15 | 10 | 46 | ca 25 | ca 25 | ca 25 | ca 25. |
| Time, hr | 0.2 | 1.2 | 0.6 | 2.0 | 1.3 | 2.0 | 2.0. |
| Recovery of charge, percent w | 103 | 113 | 117 | 109 | 101 | 99.6 | 103.2. |
| Yield of finished polymer, percent w. of feed, no-loss basis | ca 100 | 5.3 | 11.9 | 8.5 | 17.6 | 17.5 | 27.2. |
| Polymer molecular weight (ebullioscopic [2]) | 1,100±50 | 890±40 | 690±30 | (600–800)[5] | (400–500)[5] | (800–1,000).[5] |

[1] Experiments 1–3 were made in a stirred glass reactor with internal cooling coil; experiments 4–7 were made in a 250 ml. stainless steel autoclave. In the latter series, 3-methylbutene-1 was fed slowly and continuously by means of a high pressure syringe pump.
[2] Described in Daniels et al., Experimental Physical Chemistry, 1949, pp. 75–79.
[3] Catalyst added as suspension in all or part of total solvent, 5 mg. catalyst/ml. of solvent.
[4] Monomer added uniformly during entire run period.
[5] Estimated visually by comparison with samples of known molecular weight.

Lubricating compositions of the invention may also contain any well known additives such as oxidation inhibitors, VI improvers, extreme pressure agents, pour point depressants, antiwear agents, foam inhibitors, corrosion inhibitors, etc.

I claim as my invention:

1. A lubricant composition comprising a major amount of a lubricating oil and a viscosity index increasing amount of a poly(3-methylbutene-1) having a molecular weight of from about 200 to about 200,000 in which a major proportion of the polymer consists of

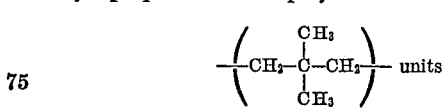

units

2. The composition of claim 1 in which 60 to 98% of the polymer consists of

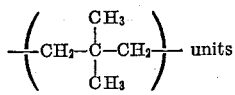 units

3. The composition of claim 1 in which 80 to 95% of the polymer consists of

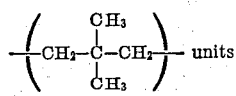 units

4. A lubricant composition comprising a major amount of a mineral lubricating oil and 1 to 10% of poly(3-methylbutene-1) having a molecular weight of from about 10,000 to about 200,000 in which a major proportion of the polymer consists of

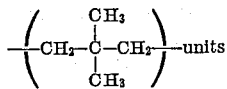 units

5. A lubricant composition comprising a major proportion of a mineral lubricating oil and from about 0.2 to about 10% by weight of a dispersant consisting essentially of the addition product of
(1) poly(3-methylbutene-1) in which a major proportion of the polymer consists of

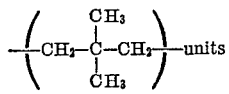 units having a molecular weight of from 500 to 3000,
(2) maleic anhydride, and
(3) tetraethylene pentamine.

6. A hydrocarbon lubricating oil which contains an oil soluble viscosity index modifier in amount sufficient to improve the viscosity index of the lubricating oil said modifier consisting of 1,3-poly-3-methyl-1-butene produced by polymerizing 3-methyl-1-butene at a temperature below 0° C. in the presence of an aluminum halide catalyst.

References Cited

UNITED STATES PATENTS

| | | | |
|---|---|---|---|
| 2,637,720 | 5/1953 | Schneider et al. | 252—59 X |
| 2,779,753 | 1/1957 | Garabrant et al. | 252—59 X |
| 2,825,721 | 3/1958 | Hogan et al. | 252—59 X |
| 3,024,195 | 3/1962 | Drummond et al. | 252—51.5 |
| 3,076,764 | 2/1963 | Hansen et al. | 252—59 |
| 3,131,150 | 4/1964 | Stuart et al. | 252—51.5 X |
| 3,154,560 | 10/1964 | Osuch | 252—51.5 X |
| 3,182,024 | 5/1965 | Stuart et al. | 252—50 |
| 3,219,666 | 11/1965 | Norman et al. | 252—51.5 X |

FOREIGN PATENTS 605,571    9/1960    Canada.

DANIEL E. WYMAN, *Primary Examiner.*

W. CANNON, *Assistant Examiner.*

U.S. Cl. X.R.

252—47.5, 59